United States Patent [19]

Pierce

[11] 4,133,553
[45] Jan. 9, 1979

[54] SELF-CLOSING TRAILER COUPLER
[75] Inventor: William C. Pierce, Muskegon, Mich.
[73] Assignee: The Hammerblow Corporation, Wausau, Wis.
[21] Appl. No.: 757,996
[22] Filed: Jan. 10, 1977
[51] Int. Cl.² .............................................. B60D 1/06
[52] U.S. Cl. ................................... 280/509; 280/512; 403/141
[58] Field of Search ............... 280/508, 509, 511, 512, 280/434; 403/141, 143, 316

[56] References Cited
U.S. PATENT DOCUMENTS

| 1,400,402 | 12/1921 | Anderson | 280/509 |
| 2,783,060 | 2/1957 | Arend | 280/509 |
| 2,855,222 | 10/1958 | Bolmes | 280/509 X |

Primary Examiner—Evon C. Blunk
Assistant Examiner—Michael J. Forman
Attorney, Agent, or Firm—McGarry & Waters

[57] ABSTRACT

A coupler for a trailer and the like, the coupler having a body and cap hinged together at a front portion and closeable along parting faces and having an internal cavity formed by the body and the cap for the ball which is conventionally secured to either the trailer or the towing vehicle. The body forms a major portion of the ball cavity and includes a ball centering upper surface which extends substantially laterally across the upper surface of the cavity, forming a self-centering bearing surface for the ball. An automatic closing device is formed on a front portion of the cap and body wherein insertion of the ball into the ball cavity automatically closes the cap with respect to the body. The closing device includes a protrusion on the cap at an opposite side of the hinge where the cap encloses the ball cavity. The protrusion extends through an aperture in the body and projects into the ball cavity when the cap is in an open position. Placement of or forward pressure toward the hinge by the ball within the ball cavity pushes the protrusion out of the cavity and the protrusion in turn exerts a closing force on the cap.

8 Claims, 4 Drawing Figures

SELF-CLOSING TRAILER COUPLER

BACKGROUND OF THE INVENTION

1. Field of the Invention

This invention relates to couplers for trailers and the like. More particularly, the invention relates to a coupler wherein a cap is automatically closed when a ball is placed within the ball cavity of the coupler.

2. Description of the Prior Art

Jacob, in U.S. Pat. Nos. 1,927,591 and 1,977,065, issued Sept. 19, 1933 and Oct. 16, 1934, respectively, discloses a trailer hitch in which a body and cap are hinged at a front portion and form hemispherically shaped cavities for enclosing a coupling ball. A collar is spring biased in a forward position on a rear portion of the body and releasably latches the cap in a closed position around the ball. In the later Jacob patent, a boss is formed on the body on the parting face and the cap has a corresponding recess which fits over the boss when the cap is closed to the body. The cap has a tapered side surface against which the collar bears for a snug fit of the cap around the ball. The spring biased collar rides up on the tapered surface so that the collar automatically adjusts the cap for slight variations in a given ball size and for wear between the ball and the cavity and socket therefor.

In the U.S. Pat. No. 3,759,549 issued to Morris on Sept. 18, 1973, a compression spring is placed to the rear of the ball cavity and operably connected between the body and rear portion of the cap. The compression spring automatically pushes open the cap which is hinged in the front to the body. A rotatable locking sleeve has an offset recess which limits the opening movement of the cap.

The U.S. Pat. No. 3,880,450 issued to Ware on Apr. 29, 1975 discloses and claims a coupler having a body and cap hinged together at the front portion. The body forms the major portion of the ball cavity and includes a ball centering upper surface of the cavity forming a self-centering bearing surface for the ball. One of the body or cap has a tapered rearwardly extending surface which a collar engages and latches the cap to the body.

SUMMARY OF THE INVENTION

According to the invention, a coupler has a body and a cap hinged together at a front portion thereof. The cap and body close along parting faces thereof. Both the body and cap have internal recesses forming a cavity for the ball when the body and cap are closed along the parting faces thereof. The coupler has means for releasably latching the cap to the body in a closed position and means for automatically closing the cap and body along the parting faces thereof when the ball is positioned within the ball cavity.

Preferably, the body recess cavity forms the major part of the ball cavity and includes a concave upper surface which extends substantially laterally across the upper surface of the ball cavity and forms a self-centering bearing surface for the ball.

Preferably, the cap is hinged to the body with a vertical pivot axis.

The automatic closing means includes a protrusion which is mounted onto the cap so that the protrusion extends through an aperture in the body and projects into the ball cavity when the cap is in an open position.

In one embodiment, the protrusion is in the form of a pin on the cap at an opposite side of the hinge from the cap recess. Preferably the pin is permanently affixed to or is threaded into the threaded aperture within an extension portion of the cap. The pin typically has an oblique outer end which abuts the ball when the ball is positioned in the cavity.

Desirably, when the cap is fully closed, the oblique end of the pin is slightly recessed from the surface of the cavity to prevent wearing of the pin against the enclosed ball.

In a preferred embodiment, the releasable latching means has a slidable collar mounted on the body. A spring biases the collar in a latching position. When the collar is in a rear position, the cap can be opened. The collar is slidable to a forward position wherein it encircles and latches the cap to the body when the cap is in a closed position.

Preferably, the extension portion of the cap, when opened, abuts a recessed outer surface of the body. The abutting of the extension with the recessed surface limits the pivotal movement of the cap with the body. The cap movement is so limited that the cap is prevented from pivoting to a position wherein the collar may slide forward between the cap and body. Instead the cap, when in a fully opened position, has a rear surface abutting the front edge of the collar.

Preferably, the exterior of the cap is tapered toward the collar so the collar exerts a closing pressure on the cap when in a latched position. In operation, the cap is initially in an open position wherein the pin projects into the ball cavity through an aperture in the body. The ball is preferably placed against the body portion wherein the body portion automatically centers the ball. The ball presses against the pin and pushes the pin out from the cavity. As the pin is pushed out of the cavity, the cap is directed to a closed position. When the ball is fully within the cavity, the cap is positioned to enable the slideable collar to slide over the tapered surface of the cap. The closing pressure exerted by the collar completes the closing of the cap to the body.

In one embodiment, the compression spring is attached to the cap and body behind the cavity. The spring exerts an opening pressure on the cap to automatically open the cap when the collar is opened and the ball is being removed from the cavity.

One of the important features of the invention is that the cap automatically closes upon placement of the ball within the ball cavity. The pin forces the cap to a latched position. Upon the cap obtaining a closed position, the spring biased collar automatically slides forward and latches the cap to the body in a fully closed position.

These and other advantages and features of the invention will hereinafter appear, and for purposes of illustration, but not of limitation, a preferred embodiment of the present invention is described in detail below and shown in the appended drawings.

DETAILED DESCRIPTION OF THE PREFERRED EMBODIMENT

Figure 1:
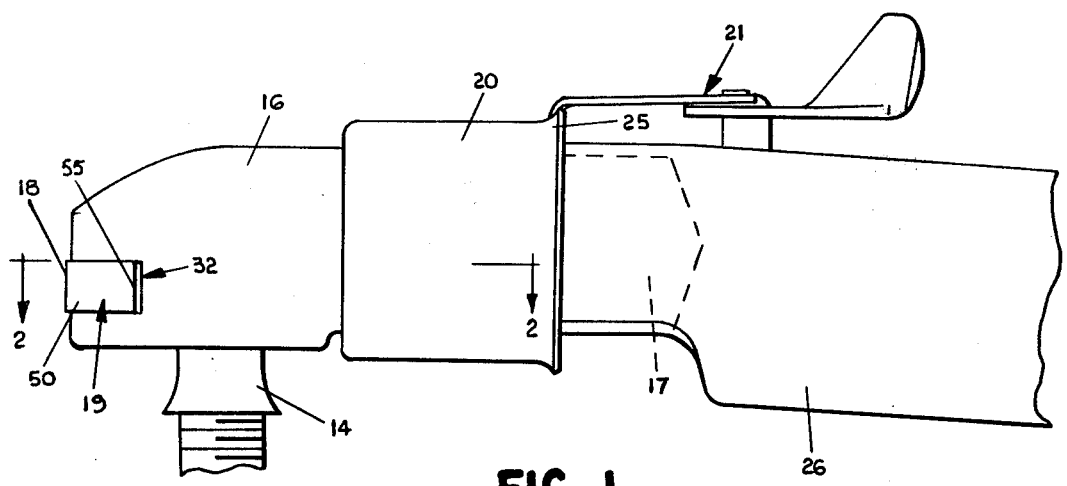
FIG. 1 is a side elevational view of an embodiment of the invention coupled to a ball.
Figure 2:
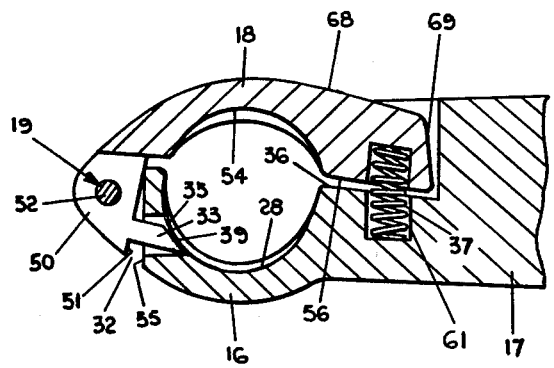
FIG. 2 is a fragmentary cross-sectional view of the coupler illustrated in FIG. 1 along line 2—2.
Figure 3:
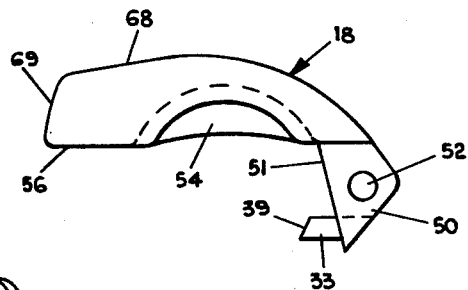
FIG. 3 is a bottom plan view of the cap as illustrated in FIG. 2.
Figure 4:
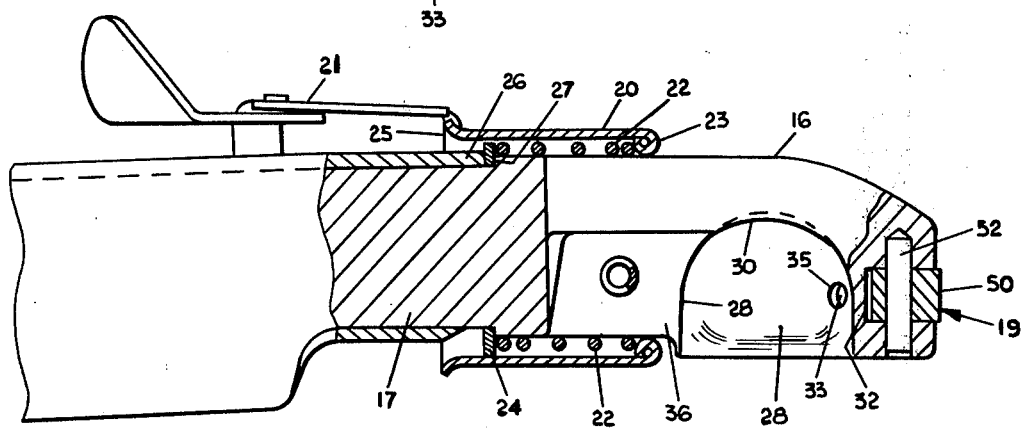
FIG. 4 is a side elevational view partially in section of the embodiment taken as illustrated in FIG. 1 but from an opposite side.

For the purposes of reference, referring to the drawings, FIGS. 1 and 2 have a perspective wherein the front of the coupler is positioned toward the left. FIGS. 3 and 4 are perceived so the front is directed toward the right.

Referring particularly to FIG. 1, there is shown a coupler enclosing a conventional ball 14. The coupler is formed from the body 16 and a cap 18 (mostly hidden from view). The cap 18 has an extending portion 50 which is hinged in a recessed portion 32 of the body 16 at point 19. A collar 20 latches body 16 and cap 18 in a closed position. Handle 21 engages a rear flange 25 of collar 20. Handle 21 is pivotably mounted on tongue 26 behind rear portion 17 of body 16.

Referring particularly to FIG. 2, the cap 18 has an extending front portion 50 which fits within the recess 32 of body 16. A pivot pin 52 extends through the extending portion 50 making a hinge between the cap 18 and body 16. A pin 33 is permanently secured to extending portion 50 and extends laterally therefrom. The pin 33 has a circular cross-section. The pin 33 can also be integrally formed with the cap 18 and have various cross-sectional shapes. The pin 33 fits within the aperture 35 of body 16. Aperture 35 extends to the interior recess 28 of body 16.

As seen in FIG. 4, the aperture 35 extends through the middle vertical section of the recess 28. The upper surface 30 of recess 28 is concavely spheroidal and thus self-centering with respect to the ball 14.

The cap is positioned so when the cap is in a closed position, the pin 33 is slightly recessed within aperture 35 from the surface of cavity 28. For example, the pin 33 can be recessed 1/16 inch from the surface of recess 28. The sloping inner surface 51 of extension 50 is angled away from surface 55 within recess 32 of the body 16 leaving a space therebetween.

The body portion 16 has an extending tapered rear surface 36 having a notch 61 which has a compression spring 37 mounted therein. The compression spring 37 promotes the opening of the cap 18 with respect to the body 16.

The cap 18, more clearly shown in FIG. 3, has a recessed portion 54 having a partial spherical shape formed in the interior side thereof. The recessed portion 54 aligns with the recess 28 of the body 16 so the ball 14 fits and is engaged therein. The extending portion 50 has a pin 33 rigidly mounted near the end of the extending portion 50. The pin protrudes from the sloping inner surface 51. The outer end 39 of the pin 33 has an angular taper to substantially conform with the surface of the cavity 28 at the aperture 35. The exterior side 68 of cap 18 is tapered inwardly toward the rear. Rear exterior surface 68 and rear surface 56 are spaced apart to provide a back edge 69.

Referring particularly to FIG. 4, the collar 20 is slideably mounted on the back portion 17 of the body 16 and biased to a closed position by a spring 22. The spring 22 has its back portion abut a retaining ring 24 and has its front portion engaged with rolled end 23 of the collar 20. The retaining ring 24 is fixed in position between the forward end of the tongue 26 and a shoulder 27 of the body 16. Tongue 26 is secured to the back portion 17 of the body 16 in a conventional fashion such as by rivets, welding, and the like. The aperture 35 is midway between the top and bottom of recess 32.

In operation, when the cap is open, the pin 33 extends into the recess 28 of the body 16. The ball 14 can be placed within the recess 28 and it will be self-centered by the top surface 30. As the ball is placed within the recess 28, the ball presses against pin 33 and displaces it out from the recess 28. As the pin is pushed out of the recess 28, the cap 18 pivots around its hinge 19 and closes with respect to the body. As the ball 14 attains a self-centered position in the hollow ball cavity, the protrusion pushes cap 18 to a position wherein collar 20 may extend over cap 18 and rear section 17 of body 16. The collar 20 automatically slides forward under pressure from spring 22 to bias the tapered exterior surface 68 of the cap 18 to a closed position. The cap 18 is further closed by the pressure exerted by collar 20 so pin 33 becomes slightly recessed from surface of recess 28. When the collar 20 is closed around cap 18, the ball 14 is correctly seated under self-centering surface 30 so recess 28 and the cap 18 correctly clamps over ball 14.

In the unlikely event the cap 18 is not closed at the time the body 16 is placed over the ball, the cover will be closed when the vehicle is pulled. Forward pressure on the ball will bring the ball squarely against the pin 33 to close the cap. The collar 20 will then slide forward to latch the cap 17 in a closed position.

Handle 21 can be pivoted so as to pull back collar 20 away from cap 18 and cap 18 may be then pivoted to an open position wherein ball 14 can be disengaged from the coupler. Spring 37 automatically opens cap 18 when ball 14 is being removed from the cavity 28. The surface 51 of the extension 50 abuts surface 55 within recess 32 so as to limit the opening movement of cap 18. The cap 18 can be opened so back edge 69 abuts rolled edge 23 of collar 20. The cap 18 is incapable of being opened so collar 20 disengages from cap 18 and slides forward into spring 37.

In this fashion, a coupler features an automatic closing mechanism and latching device whereby the positioning of the ball within the ball cavity automatically closes the cap with respect to the body by a pushing of a pin from within the ball cavity. The pin, when pushed out from the cavity, closes the cap to allow the collar to slide forward over the tapered rear surface of the cap so that it may latch the cap with the body.

Reasonable variation and modification are possible within the scope of the foregoing disclosure, the drawings, and the appended claims without departing from the spirit of the invention.

The embodiments of the invention in which an exclusive property or privilege is claimed are defined as follows:

1. In a coupler for a trailer wherein a ball is secured to one of either a vehicle or trailer and said coupler is secured to the other of said vehicle, said coupler has a body, a cap and a hinge pivotably mounting the cap to a front portion of said body, said cap and body being closeable along parting faces thereof; each of said body and cap having internal recesses forming a cavity for said ball when the body and cap are closed along parting faces thereof; and means for releasably latching said cap to said body in a closed position; the improvement which comprises:

a protrusion rigidly connected to the cap at a side of the hinge opposite the interior recess of the cap; the body has an opening therethrough at a front portion thereof; the protrusion in registry with and projecting through the opening and into the cavity when the cap is open and away from the body; and the protrusion being so positioned that axial force by a ball toward the hinge forces the protrusion from the cavity and thereby closes the cap to the body.

2. A coupler according to claim 1 wherein the releasably latching means comprises a collar slidably mounted on the body from a rear position to allow opening of said cap, to a forward latching position wherein said collar latches the cap to the body.

3. A coupler according to claim 2 wherein the protrusion is positioned so that when the ball is within the ball cavity, the ball pushes the protrusion which directs the cap to a position where the cap can be latched by the slidable collar.

4. A coupler according to claim 3 wherein the exterior side of the cap is tapered; the slidable collar is biased to a forward position by a spring mounted between the collar and the body; and the collar engages the tapered side of the cap and latches the cap in a closed position.

5. A coupler according to claim 3 wherein the protrusion is secured on an extended portion of the cap; said extended portion abuts the body when the cap is opened to limit the pivotal opening movement of the cap to a point in abutment with the collar so that the collar cannot be positioned between the cap and body.

6. A coupler according to claim 1 wherein the protrusion has an oblique tip substantially conforming to the surface of the cavity at the opening; and said oblique tip is slightly recessed from the surface when the cap is in a closed position.

7. A coupler according to claim 6 wherein the cap is hinged to the body with a substantially vertical pivotal axis, the protrusion laterally extends through an opening of the body; and the protrusion protrudes into the ball cavity at a point centrally between the top and bottom of the cavity.

8. A coupler for trailers for use with a ball member comprising:

a body and cap hinged together at a front portion of said body along a substantially vertical pivotal axis;

said cap and body being closeable along parting faces thereof; each of said body and cap having internal recesses forming a cavity retaining the ball member when the body and cap are closed along parting faces thereof;

said body recess forming a major portion of the cavity, the body recess including a spherical concave upper surface which extends substantially laterally across the upper surface of said cavity and forms a self-centering bearing strip for said ball;

means for releasably latching the cap to the body in a closed position;

means for automatically closing the cap and body along parting surfaces thereof when the ball is positioned within the cavity and forced toward the front portion of the body;

the closing means includes a laterally extending protrusion rididly connected to the cap at a side of the hinged front portion opposite the cap internal recess;

the body has a lateral opening therethrough; and the protrusion projects through the opening and into the ball cavity when the cap is in an open position, whereby closure of the cap retracts the protrusion from the ball cavity.

* * * * *